United States Patent
Okuyama

(10) Patent No.: US 12,554,162 B2
(45) Date of Patent: Feb. 17, 2026

(54) UV IRRADIATION DEVICE

(71) Applicant: Japan Display Inc., Tokyo (JP)

(72) Inventor: Kentaro Okuyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/826,370

(22) Filed: Sep. 6, 2024

(65) Prior Publication Data

US 2025/0085593 A1    Mar. 13, 2025

(30) Foreign Application Priority Data

Sep. 7, 2023  (JP) ................. 2023-145548

(51) Int. Cl.
| | | |
|---|---|---|
| *G02F 1/13357* | (2006.01) | |
| *G02F 1/1333* | (2006.01) | |
| *G02F 1/1334* | (2006.01) | |
| *G02F 1/139* | (2006.01) | |

(52) U.S. Cl.
CPC .. *G02F 1/133617* (2013.01); *G02F 1/133305* (2013.01); *G02F 1/1334* (2013.01); *G02F 1/133603* (2013.01); *G02F 1/133606* (2013.01); *G02F 1/133608* (2013.01); *G02F 1/139* (2013.01)

(58) Field of Classification Search
CPC ......... G02F 1/133617; G02F 1/133305; G02F 1/1334; G02F 1/133603; G02F 1/133606; G02F 1/133608
See application file for complete search history.

(56) References Cited

U.S. PATENT DOCUMENTS

| | | |
|---|---|---|
| 2020/0310175 A1 | 10/2020 | Okuyama et al. |
| 2021/0397051 A1 | 12/2021 | Ikeda et al. |
| 2024/0004231 A1* | 1/2024 | Hagiwara ............. G02F 1/13 |

FOREIGN PATENT DOCUMENTS

| | | | |
|---|---|---|---|
| JP | 2008190905 A | * | 8/2008 |
| JP | 2016066754 A | * | 4/2016 |
| JP | 2020-144272 A | | 9/2020 |
| JP | 2020-160322 A | | 10/2020 |

OTHER PUBLICATIONS

Kitabayashi et al. JP2008-190905-machine translation (Year: 2008).*
Takeo, JP2016066754, machine translation (Year: 2016).*

* cited by examiner

*Primary Examiner* — Tracie Y Green
(74) *Attorney, Agent, or Firm* — Maier & Maier, PLLC

(57) ABSTRACT

A UV irradiation device comprises a light source unit including a plurality of light sources irradiating ultraviolet light and a control unit adjusting an amount of ultraviolet light irradiated from the light source unit toward a surface of a liquid crystal cell having at least a partially curved surface. The control unit adjusts the amount of ultraviolet light irradiated from the light source unit toward the surface of the liquid crystal cell so that an illuminance of the ultraviolet light in any first region on the curved surface of the liquid crystal cell is equal to the illuminance of the ultraviolet light in any second region on the surface of the liquid crystal cell including the curved surface that is different from the first region.

6 Claims, 10 Drawing Sheets

UV IRRADIATION DEVICE

CROSS-REFERENCE TO RELATED APPLICATIONS

This application claims the benefit of priority to Japanese Patent Application No. 2023-145548, filed on Sep. 7, 2023, the entire contents of which are incorporated herein by reference.

FIELD

The present invention relates to a manufacturing method for a display panel and a UV irradiation device.

BACKGROUND

In recent years, a polymer dispersed liquid crystal (PDLC) display device has attracted attention. For example, the PDLC is in an opaque white condition when no voltage is applied, and becomes transparent when a voltage is applied. For example, the PDLC-based display device (hereinafter referred to as the PDLC display device) using this feature can realize daylighting and shading of a glass window by turning on and off power. In addition, the PDLC display device can realize a wide viewing angle without using a polarization plate. For example, such a PDLC display device is disclosed in Japanese laid-open patent publication No. 2020-144272 and Japanese laid-open patent publication No. 2020-160322.

SUMMARY

According to an embodiment of the present invention, there is provided a UV irradiation device including a light source unit including a plurality of light sources irradiating ultraviolet light, and a control unit adjusting an amount of ultraviolet light irradiated from the light source unit toward a surface of a liquid crystal cell having at least a partially curved surface, wherein the control unit adjusts the amount of ultraviolet light irradiated from the light source unit toward the surface of the liquid crystal cell so that an illuminance of the ultraviolet light in any first region on the curved surface of the liquid crystal cell is equal to the illuminance of the ultraviolet light in any second region on the surface of the liquid crystal cell including the curved surface that is different from the first region.

According to an embodiment of the present invention, there is provided a UV irradiation device including a light source unit including a plurality of light sources irradiating ultraviolet light, a support unit supporting a liquid crystal cell having at least a partially curved surface, and a diffuser plate diffusing ultraviolet light irradiated from the light source unit toward the liquid crystal cell,
  wherein the diffuser plate has a first diffusion region having a first diffusion rate and a second diffusion region having a second diffusion rate higher than the first diffusion rate.

DESCRIPTION OF EMBODIMENTS

Figure 1:
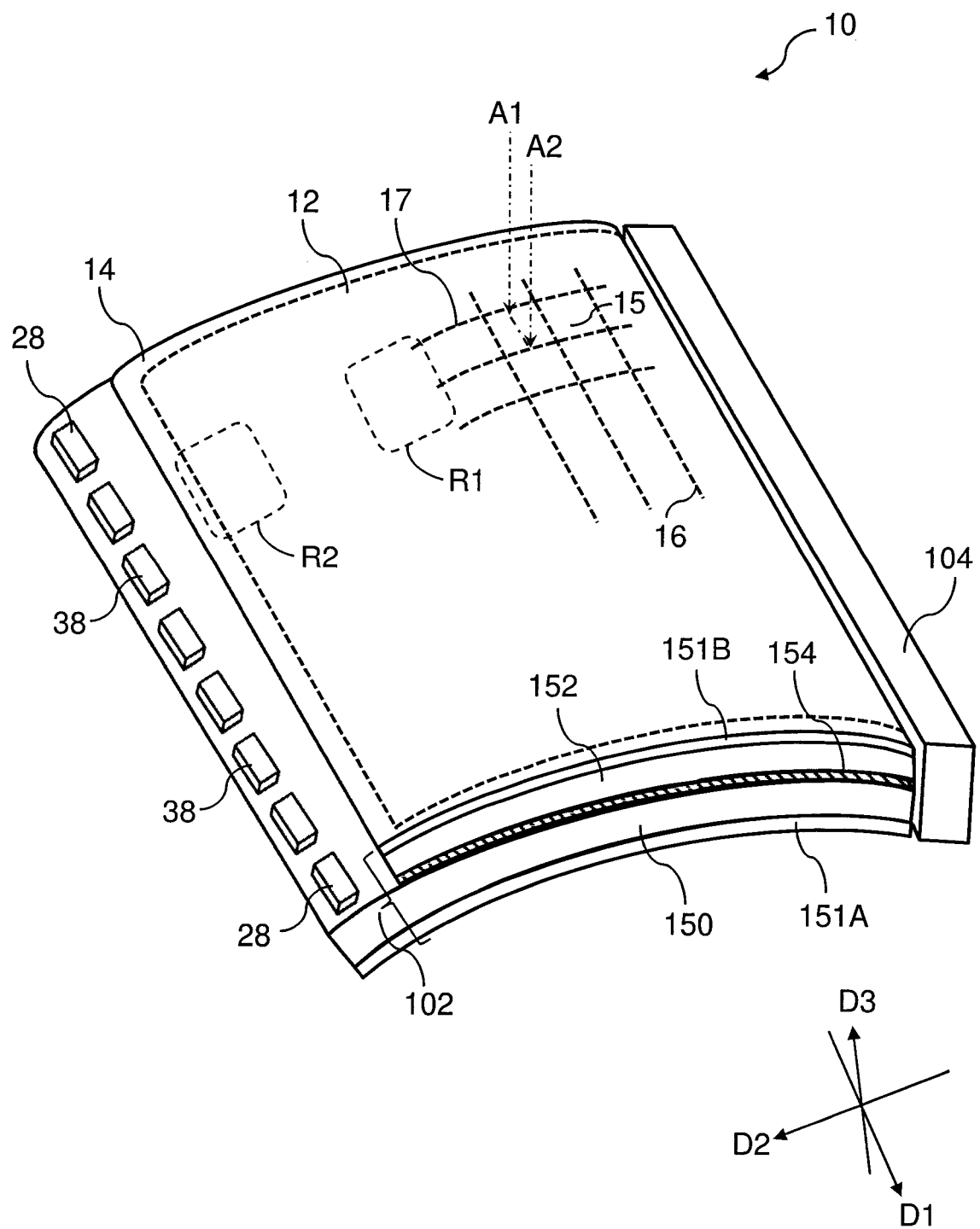
FIG. 1 is a perspective view of a display device according to an embodiment.

A photopolymerization phase separation method is known as a manufacturing method for a PDLC cell. The photopolymerization phase separation method is a method in which a mixture of a liquid crystal and a monomer, which is a UV-curable resin, is irradiated with ultraviolet light to polymerize the monomer, and the polymer formed by the polymerization of the monomer and the liquid crystal are phase-separated. In the photopolymerization phase separation method, the distribution of the polymer inside the cell caused by the polymerization of the monomer can be controlled by the conditions in the UV irradiation step, for example, the wavelength, illuminance, integrated illuminance, temperature, and the like of the ultraviolet light to be irradiated.

In the case where the display panel has a curved surface, the PDLC cell can be applied to the curved surface. When the PDLC cell is formed on a base material such as a film or a substrate and the base material is bent after the UV irradiation, the polymer structure cured by the UV irradiation is destroyed, which may result in clouding of the display panel or luminance unevenness.

According to the present invention, it is possible to provide a manufacturing method for the PDLC display device having uniform display characteristics.

In addition, according to the present invention, it is possible to provide a UV irradiation device used in the manufacturing method for the PDLC display device having uniform display characteristics.

Hereinafter, embodiments of the present invention will be described with reference to the drawings and the like. However, the present invention can be implemented in various aspects without departing from the gist thereof, and is not to be construed as being limited to the description of the embodiments exemplified below. Furthermore, in order to make the description clearer with respect to the drawings, the width, thickness, shape, and the like of each part may be schematically represented in comparison with actual embodiments, but the schematic drawings are merely examples, and do not limit the interpretation of the present invention.

In the present specification and the drawings, elements that are the same as or similar to those described with respect to the above-described drawings are denoted by the same reference signs, and redundant descriptions thereof may be omitted. In this specification and the like, ordinal numbers are given for convenience in order to distinguish components, parts, and the like, and do not indicate priority or order. In addition, in the case where a plurality of identical elements is arranged and when it is necessary to distinguish individual elements, each element may be distinguished by a different alphabet after a sign indicating an element. However, in the case where it is not necessary to distinguish each element, an alphabet may be omitted from a sign indicating an element.

In the present invention, in the case where a certain film is processed to form a plurality of films, the plurality of films may have different functions or roles. However, these films are derived from a film formed as the same layer in the same process, and have the same layer structure and the same material. Therefore, the plurality of films is defined as being present in the same layer. Furthermore, in the case where a plurality of patterns is formed by processing a certain film, in the present specification and the like, each pattern may be distinguished by adding an ordinal number.

In addition, in the present specification and the like, expressions such as "above" and "below" represent a relative positional relationship between a structure of interest and another structure. In the present specification and the like, in a side view, a direction from an array substrate to a counter substrate, which will be described later, is defined as "above", and a reverse direction thereof is defined as "below". In the present specification and claims, the expression "above" in describing the manner of arranging another structure on a certain structure shall include both arranging another structure directly above a certain structure and arranging another structure on a certain structure via yet another structure, unless otherwise specified.

In each embodiment, the expressions "α includes A, B, or C," "α includes any of A, B, and C," and "α includes one selected from a group consisting of A, B and C" do not exclude the case where α includes a plurality of combinations of A to C unless otherwise indicated. Furthermore, these expressions do not exclude the case where α includes other elements.

Display Device

FIG. 1 is a perspective view of a display device 10. As shown in FIG. 1, the display device 10 includes a display panel 102, a light source 104, a protective substrate (base material) 151A, and a protective substrate (base material) 151B.

The display panel 102 is a PLDC display panel. As shown in FIG. 1, the display panel 102 includes a first substrate 150, a second substrate 152, a liquid crystal layer 210 (see FIG. 2) between the first substrate 150 and the second substrate 152, a gate driving circuit 28, and a data driving circuit 38. The display panel 102 has at least a partially curved surface.

In the present embodiment, each of the first substrate 150 and the second substrate 152 includes light transmittance and flexibility. Specifically, support substrates that are the base of the first substrate 150 and the second substrate 152 are both transparent to visible light and have flexibility. In addition, at least one of the support substrates that are the base of the first substrate 150 and the second substrate 152 is, for example, a glass thin enough to form the curved surface. Alternatively, the support substrate may be a film-like base material having flexibility. In the case where the support substrates of the first substrate 150 and the second substrate 152 are the base material on a film, for example, they are a transparent insulating substrate or a film material containing a polyester resin, such as polyethylene terephthalate (PET) and polyethylene naphthalate (PEN), an acrylic resin, such as polymethyl methacrylate (PMMA), a polyolefin resin, such as polypropylene (PP), a cellulosic resin, such as triacetyl cellulose (3 cellulose acetate: TAC), a cycloolefin polymer (COP), a cyclic olefin resin (COC), a polycarbonate (PC) resin, and the like, and from the viewpoint of transparency, a cycloolefin polymer (COP) and a cyclic olefine-based resins (COC) are preferred. The second substrate 152 is arranged to face the first substrate 150. The first substrate 150 and the second substrate 152 are arranged to face each other with a gap therebetween, and are bonded to each other by a sealing material 154. The liquid crystal layer 210 is arranged in the gap between the first substrate 150 and the second substrate 152.

The first substrate 150 has a display region 12 and a peripheral region 14 positioned outside the display region 12. A plurality of pixels 15, a plurality of gate lines 16, and a plurality of data lines 17 are arranged in the display region 12. A region surrounded by the gate wiring 16 and the data wiring 17 functions as each pixel 15. The plurality of gate lines 16 is arranged along a predetermined direction. The plurality of data lines 17 is arranged along a direction perpendicular to the predetermined direction. Hereinafter, an extension direction of the plurality of gate lines 16 is referred to as a first direction D1, and an extension direction of the plurality of data lines 17 is referred to as a second direction D2. In addition, a direction perpendicular to both the first direction D1 and the second direction D2 is defined as a third direction D3.

The plurality of pixels 15 is arranged in a row direction and a column direction. In this case, the row direction refers to a direction parallel to the first direction D1, and the column direction refers to a direction parallel to the second direction D2. In the display region 12, m pixels 15 are arranged in the row direction, and n pixels 15 are arranged in the column direction. The values of m and n are appropriately set according to the display resolution of the vertical direction and the display resolution of the horizontal direction. Each of the plurality of pixels 15 includes a pixel circuit including a switching element formed by a thin film transistor (TFT). The pixel circuit includes the switching element and a capacity element, and controls on/off of each pixel 15. The thin film transistor is formed on the support substrate constituting the first substrate 150. That is, the first substrate 150 is an array substrate. The second substrate 152 is a counter substrate facing the array substrate.

The gate driving circuit 28 and the data driving circuit 38 are arranged in the peripheral region 14 of the first substrate 150. Although not shown, a wiring group connecting the gated lines 16 and the gate driving circuit 28, and a wiring group connecting the data lines 17 and the data driving circuit 38 are arranged in the peripheral region 14. FIG. 1 shows an aspect in which the gate driving circuit 28 and the data driving circuit 38 are provided as an integrated circuit (IC) and mounted in a COG (Chip on Glass) method on the support substrate of the first substrate 150. However, the gate driving circuit 28 and the data driving circuit 38 may be mounted on the support substrate in a COF (Chip on Film) method, or may be formed on the support substrate by the thin film transistor in the same manner as the above-described pixel circuit.

The light source 104 is an elongated member extending along the first direction D1. For example, the light source 104 is composed of a plurality of light-emitting diodes (LED) arranged along the first direction D1. The light source 104 may include an optical member such as a reflector, a diffuser, a lens, and the like, in addition to the light-emitting diode. A timing of light emission of the light source 104 is controlled by a light emission control circuit (not shown) that is synchronized with the gate driving circuit 28 and the data driving circuit 38. In addition, the light source 104 and the light emission control circuit may be arranged as separate members (light-emitting unit) independent of the display panel 102. Furthermore, the light emission control circuit may be incorporated into the gate driving circuit 28 or the data driving circuit 38.

The protective substrates 151A and 151B are the base material that protect the display panel 102. The protective substrate 151A is arranged adjacent to the first substrate 150, and the protective substrate 151B is arranged adjacent to the second substrate 152. The protective substrates 151A and 151B are thin glasses having light transmittance, and capable of curved surface processing. In addition, the protective substrates 151A and 151B may be a base material having flexibility (for example, a COP film, a COC film, a PET film, and the like). The protective substrates 151A and 151B may function as a light guide plate that guides a light emitted from the light source 104 to the display panel 102. In this case, the protective substrates 151A and 151B preferably have refractive index equivalent to those of the first substrate 150 and the second substrate 152. The first substrate 150 and the protective substrate 151A and the second substrate 152 and the protective substrate 151B are fixed to each other with an adhesive having light transmittance.

In the display panel 102, the first substrate 150 and the second substrate 152 are arranged to face each other in the third direction, and the liquid crystal layer 210 is arranged therebetween. The first substrate 150 is larger than the second substrate 152 and has a size that a part of the peripheral region 14 is exposed from the second substrate 152. Although not shown, a terminal unit for attaching a flexible printed circuit substrate for supplying an external signal to the gate driving circuit 28 and the data driving circuit 38 is arranged at a peripheral part of the first substrate 150.

The display panel 102 has at least a partially curved surface. For example, in FIG. 1, the display panel 102 has a curved surface that is generally convex in the third direction D3. The curved surface of the display panel 102 includes a first curved surface having a first curvature and a second curved surface having a second curvature. The second curvature is greater than the first curvature. The first curved surface is arranged in a first region R1 of the display panel 102, and the second curved surface is arranged in a second region R2 that is different from the first region R1 of the display panel 102. The first region R1 is any region on the display panel 102. The second region R2 is a region that is different from the first region R1 and is any region that is closer to an end portion of the display panel 102 in second direction D2 than the first region R1 and on the display panel 102. In other words, the second region R2 is positioned outside the first region R1 in the second direction D2.

The light source 104 is arranged adjacent to a side surface of the display panel 102. That is, the light source 104 is arranged adjacent to the side surfaces of the first substrate 150, the second substrate 152, the protective substrates 151A and 151B. Furthermore, in the present embodiment, as shown in FIG. 1, although the light source 104 is arranged adjacent to the side surface of the display panel 102, the position of the light source 104 is not limited to the position shown in FIG. 1.

Figure 2:
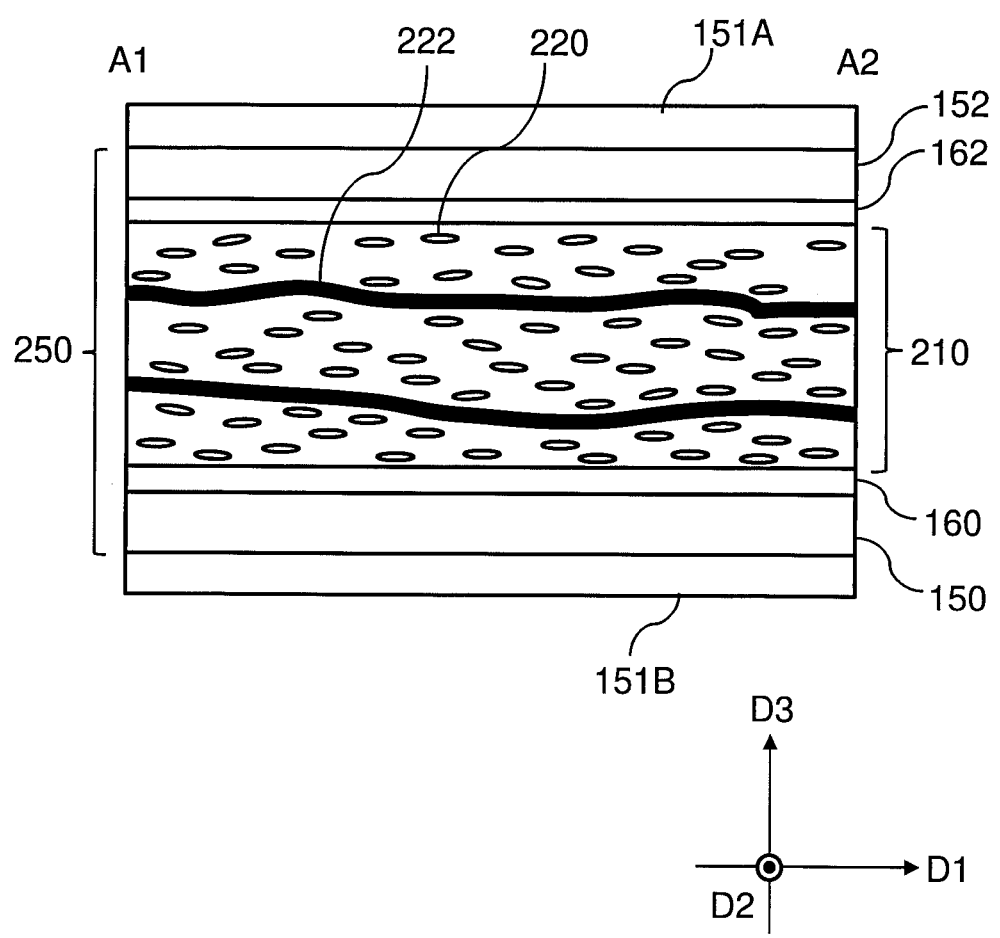
FIG. 2 is a cross-sectional view showing part of a configuration of a pixel in a display device shown in FIG. 1.

FIG. 2 is a cross-sectional view showing a part of a configuration of the pixel 15 in the display panel 102, and is a schematic diagram corresponding to a cross section between A1-A2 shown in FIG. 1. The pixel 15 includes a first electrode 160 arranged on the first substrate 150, a second electrode 162 arranged on the second substrate 152 and facing the first electrode 160, and the liquid crystal layer 210 sandwiched between the first substrate 150 and the second substrate 152. The first substrate 150, the first electrode 160, the liquid crystal layer 210, the second electrode 162, and the second substrate 152 constitute a liquid crystal cell 250.

A data voltage applied from the data driving circuit 38 via the data line 17 is applied to the first electrode 160. A predetermined voltage is applied to the second electrode 162. Although not shown, the second electrode 162 may be a common electrode common to the plurality of pixels 15, and a common voltage may be applied uniformly. The first electrode 160 and the second electrode 162 are transparent electrodes such as an ITO (Indium Tin Oxide), an IZO (Indium Zinc Oxide).

The liquid crystal layer 210 is composed of a polymer-dispersed liquid crystal and includes a liquid crystal molecule 220 and a polymer structure 222. The polymer structure 222 is formed from a polymer produced by polymerizing a photopolymerizable monomer. For example, the photopolymerizable monomer is a photocurable resin such as a UV-curable resin. In addition, the photopolymerizable monomer preferably has a liquid crystalline property from the viewpoint of alignment and transparency. The polymer structure 222 is fibrous (streaky) and is arranged in the liquid crystal layer 210 so as to extend along the extension direction of the gate lines 16. The liquid crystal molecule 220 is separated from the polymeric structure 222 and dispersed between the polymer structure 222 in the liquid crystal layer 210. The liquid crystal molecule 220 and the polymer structure 222 have optical anisotropy or refractive index anisotropy, respectively. The response of the polymer structure 222 to an electric field is lower than the response of the liquid crystal molecule 220 to the electric field. For example, the orientation direction of the polymer structure 222 hardly changes regardless of the presence or absence of the electric field. On the other hand, the orientation direction of the liquid crystal molecule 220 varies according to the magnitude of the electric field in a state where a voltage equal to or greater than a threshold is applied to the liquid crystal layer 210.

In the liquid crystal layer 210, a scattering state and a non-scattering state are controlled for each pixel 15. In this case, the "scattering state" refers to a state in which the liquid crystal molecule is aligned so that the light incident on the liquid crystal layer 210 is scattered, and the "non-scattering state" refers to a state in which the liquid crystal molecule is aligned so that the incident light passes as it is without being scattered. In a state where no voltage is applied to the liquid crystal layer 210, the optical axes of the polymer structure 222 and the liquid crystal molecule 220 are parallel to each other, and the light incident on the liquid crystal layer 210 is transmitted through the liquid crystal layer 210 with almost no scattering in the liquid crystal layer 210 (non-scattering state). On the other hand, in a state where a voltage is applied to the liquid crystal layer 210, the optical axis of the polymer structure 222 and the optical axis of the liquid crystal molecule 220 intersect each other. As a result, the light incident on the liquid crystal layer 210 is scattered in the liquid crystal layer 210. The "scattering state" and the "non-scattering state" are controlled by the magnitude of the electric field between the first electrode 160 and the second electrode 162 generated when a voltage is applied to the first electrode 160 and the second electrode 162. FIG. 2 shows the liquid crystal layer 210 in the "non-scattering state".

When light is incident on the display panel 102 from the light source 104, the light passing through the display panel 102 toward the second direction D2 is at least partially scattered when passing through the scattered pixel 15 in which the liquid crystal layer 210 is in the scattering state. In this case, part of the scattered light is emitted to the outside without being totally reflected, and is observed by a user of the display device 10. On the other hand, a pixel in which the liquid crystal layer 210 is in the non-scattering state does not generate scattered light, so that the incident light passes through the pixel 15 and passes directly to the back side (the side opposite to the side where the observer is present). That is, the user can view the back side through the display panel 102.

The display device 10 displays an image to the user by causing the liquid crystal layer 210 of a specific pixel 15 to the scattering state and emit the scattered light. In addition, since the pixels 15 other than the specific pixel 15 are in the non-scattering state, no scattered light is generated, and the user recognizes the pixels as transparent pixels.

[Manufacturing Method for Display Panel]

In a photopolymerization phase separation method known as one of the methods for manufacturing the PLDC display panel, generally, a liquid crystal layer containing a liquid crystal molecule and a photopolymerizable monomer is filled between two substrates, and the photopolymerizable monomer is photopolymerized to phase separate the liquid crystal molecule and the polymer structure formed by photopolymerization in the liquid crystal layer. However, as in the display panel 102 of the display device 10 described referring to FIG. 1, in the case where the display panel has a curved surface, bending the display panel after the photopolymerization breaks the polymer structure formed by the photopolymerization, which reduces the reliability of the display panel.

Therefore, in the manufacturing method for the display panel according to an embodiment of the present invention, a curved surface is formed on at least part of the display panel, and a photopolymerization reaction is carried out after the curved surface is formed. Hereinafter, the manufacturing method for the display panel according to an embodiment will be described.

Figure 3:
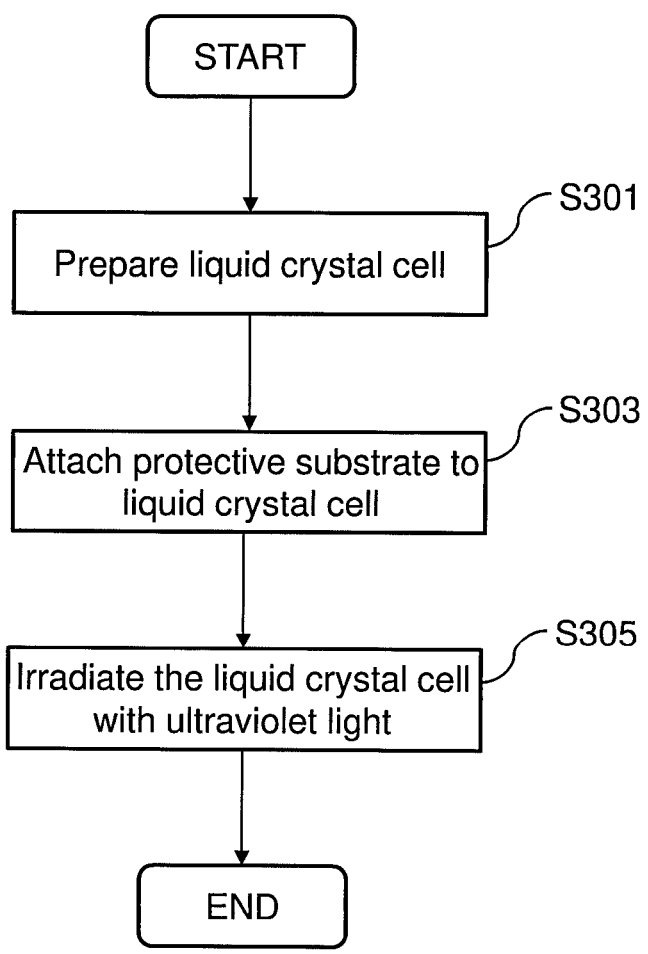
FIG. 3 is a flow diagram showing a manufacturing method for a display panel according to an embodiment.

FIG. 3 is a flow diagram showing a manufacturing method for the display panel according to the present embodiment. FIG. 4 to FIG. 7 are schematic diagrams for explaining the manufacturing method for the display panel according to the present embodiment. In FIG. 4 to FIG. 7, part of the display panel 102 such as the first electrode 160 arranged on the first substrate 150, the light source 104, the protective substrate 151A, the gate driving circuit 28, the data driving circuit 38, the second electrode 162 arranged on the second substrate 152, and the protective substrate 151B are omitted.

Figure 4:
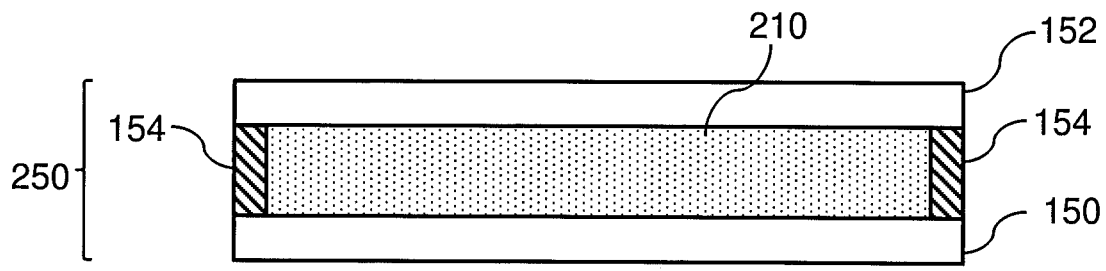
FIG. 4 is a schematic diagram illustrating a manufacturing method for a display panel according to an embodiment.
Figure 4:
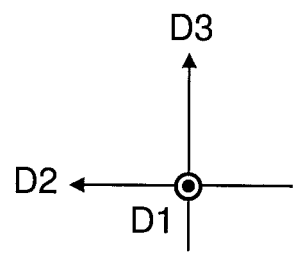

As shown in FIG. 3 and FIG. 4, the liquid crystal cell 250 is prepared (S301). In FIG. 4, the first electrode 160 and the second electrode 162 in the liquid crystal cell 250 are not shown, and only the first substrate 150, the second substrate 152, and the liquid crystal layer 210 are shown. Although not shown, the light source 104, driving circuits including the gate driving circuit 28 and the data driving circuit 38, and the like are arranged in a region corresponding to the peripheral region 14 of the first substrate 150. The liquid crystal layer 210 is filled with a liquid crystal mixture, and the liquid crystal mixture is sealed within the liquid crystal layer 210 by the sealing material 154. The liquid crystal mixture includes a liquid crystal material and photopolymerizable liquid crystal monomers. The photopolymerizable liquid crystal monomers are the photocurable resin, in this case, the UV-curable resin. The liquid crystal mixture may further include a photoinitiator.

Figure 5:
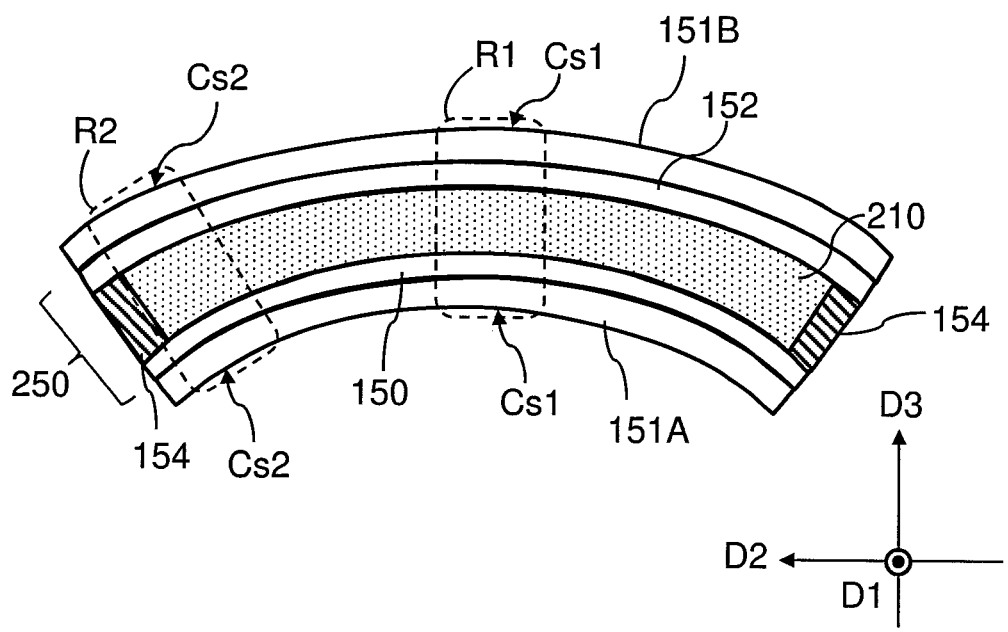
FIG. 5 is a schematic diagram illustrating a manufacturing method for a display panel according to an embodiment.

Next, as shown in FIG. 3 and FIG. 5, the protective substrate 151A and the protective substrate 151B are attached to the liquid crystal cell 250 filled with the liquid crystal mixture (S303). The protective substrate 151A and the protective substrate 151B are attached to the liquid crystal cell 250 by an adhesive (not shown) such as an OCA. Each of the protective substrate 151A and the protective substrate 151B is curved in advance to have a curved surface. In this case, each of the protective substrate 151A and the protective substrate 151B has a curved surface that is convex in the third direction D3. Each of the protective substrate 151A, the protective substrate 151B and the liquid crystal cell 250 has the first region R1 and the second region R2. The first region R1 and the second region R2 are predetermined regions on the protective substrate 151A, the protective substrate 151B and the liquid crystal cell 250. The first region R1 and the second region R2 are different from each other. In other words, the second region R2 is a predetermined region excluding the first region R1. The second region R2 is closer to the end portion of the liquid crystal cell 250 in the second direction D2 than the first region R1. Each of the first region R1 and the second region R2 corresponds to the first region R1 and the second region R2 on the display panel 102 shown in FIG. 1. A first curved surface Cs1 having a first curvature is arranged in the first region R1 and a second curved surface Cs2 having a second curvature is arranged in the second region R2. The second curvature is greater than the first curvature. In addition, the order in which the protective substrate 151A and the protective substrate 151B are attached to the liquid crystal cell 250 is not limited. For example, the protective substrate 151A may be attached first to the liquid crystal cell 250, the protective substrate 151B may be attached first to the liquid crystal cell 250, and the protective substrate 151A and the protective substrate 151B may be attached simultaneously to the liquid crystal cell 250. In addition, in S303, only one of the protective substrate 151A and the protective substrate 151B may be attached to the liquid crystal cell 250. The liquid crystal cell 250 attached to at least one of the curved protective substrate 151A and the protective substrate 151B is curved to match the shape of the attached protective substrate to form a curved surface thereon.

Figure 6:
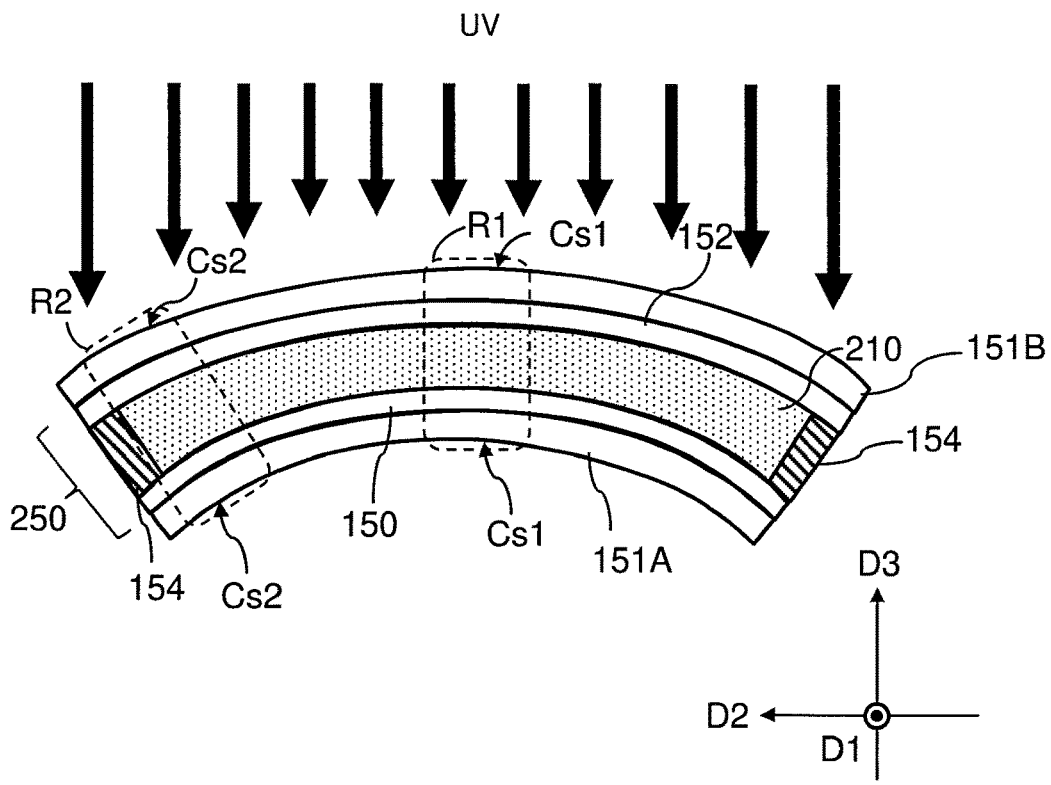
FIG. 6 is a schematic diagram illustrating a manufacturing method for a display panel according to an embodiment.

Next, as shown in FIG. 3 and FIG. 6, the liquid crystal cell 250 is irradiated with ultraviolet light (S305), and the photopolymerizable liquid crystal monomers in the liquid crystal cell 250 are polymerized to form the polymer structure 222. In FIG. 6, as an example, the light source that emits ultraviolet light is positioned on the third direction D3 side relative to the liquid crystal cell 250, that is, the upper side of the protective substrate 151B, and ultraviolet light is irradiated toward the liquid crystal cell 250 from the third direction D3. However, the position of the light source that emits ultraviolet light is not limited to the third direction D3 side relative to the liquid crystal cell 250. Here, in the case where the amount of ultraviolet light irradiated to the liquid crystal cell 250 is uniform, the illuminance in the second region R2, which has a higher curvature than the first region R1, is smaller than that in the first region R1.

Therefore, in the step of irradiating the liquid crystal cell 250 with ultraviolet light, the liquid crystal cell 250 is irradiated with ultraviolet light such that the illuminance of the ultraviolet light in the first region R1 of the display panel 102 is equal to the illuminance of the ultraviolet light in the other region of the display panel 102 excluding the first region R1. In other words, the illuminance of ultraviolet light irradiated to the liquid crystal cell 250 is made uniform throughout the liquid crystal cell 250. Specifically, the liquid crystal cell 250 is irradiated with ultraviolet light such that the illuminance of the ultraviolet light in the first region R1 of the liquid crystal cell 250 is equal to the illuminance of the ultraviolet light in the other region of the liquid crystal cell 250 including the second region R2. In this case, the illuminance is illuminance per unit area ($[mW/cm^2]$). Furthermore, in this case, the illuminance of the ultraviolet light in the first region R1 of the liquid crystal cell 250 is equal to the illuminance of the ultraviolet light in the other region including the second region R2 of the liquid crystal cell 250 means that the difference between the illuminance of the ultraviolet light in the first region R1 and the illuminance of the ultraviolet light in the other region of including the second region R2 the liquid crystal cell 250 is 15% or less. The difference between the illuminance of the ultraviolet light in the first region R1 and the illuminance of the ultraviolet light in the other region including the second region R2 of the liquid crystal cell 250 is preferably 10% or less, and more preferably 5% or less.

For example, the liquid crystal cell 250 is irradiated with ultraviolet light such that the amount of the ultraviolet light irradiated toward the second region R2, specifically, the second curved surface Cs2 of the second substrate 152, is greater than the amount of the ultraviolet light irradiated toward the first region R1, specifically, the first curved surface Cs1 of the second substrate 152. In this case, the irradiation times of the ultraviolet light irradiated toward the first curved surface Cs1 and the second curved surface Cs2 are the same.

Figure 7:
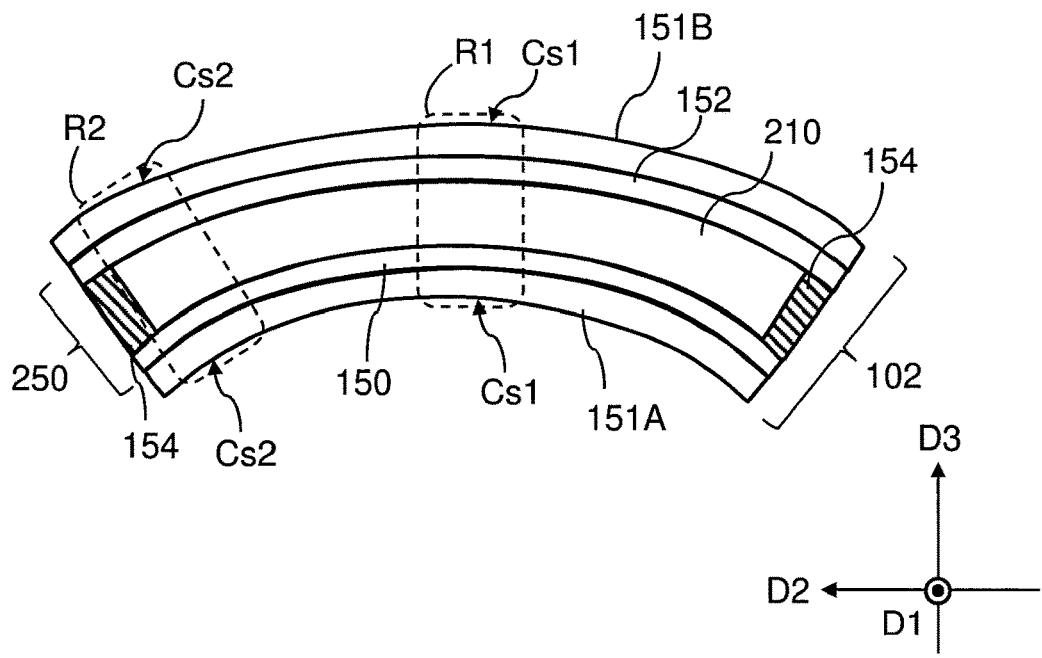
FIG. 7 is a schematic diagram illustrating a manufacturing method for a display panel according to an embodiment.

As shown in FIG. 7, when the liquid crystal cell 250 is irradiated with ultraviolet light, the photopolymerizable liquid crystal monomers in the liquid crystal mixture in the liquid crystal cell 250 are polymerized to form the polymer structure 222 as shown in FIG. 2, and the liquid crystal layer 210 is formed. At this time, in the liquid crystal layer 210, the liquid crystal molecule 220 and the polymer structure 222 are phase-separated. As a result, the display panel 102 having a curved surface is formed. In addition, although not shown, in S303, when only one of the protective substrate 151A and the protective substrate 151B is attached to the liquid crystal cell 250, the remaining one of the protective substrate 151A and the protective substrate 151B is attached to the liquid crystal cell 250 after the liquid crystal cell 250 is irradiated with ultraviolet light to form the liquid crystal layer 210, thereby forming the display panel 102.

As described above, in the present embodiment, in the step of irradiating the liquid crystal cell 250 with ultraviolet light, the amount of ultraviolet light is adjusted so that the illuminance of the ultraviolet light irradiated to the liquid crystal cell 250 to be uniform throughout the liquid crystal cell 250. If the illuminance of the ultraviolet light irradiated to the liquid crystal cell 250 is biased, the photopolymerization may not proceed sufficiently in a region where the illuminance of the ultraviolet light is relatively low, and the liquid crystal molecule 220 and the polymer structure 222 may not be sufficiently separated from each other in the liquid crystal layer 210. In such a case, there is a risk that luminance unevenness will occur in the display panel 102 between the region where the phase separation between the liquid crystal molecule 220 and the polymer structure 222 is insufficient and the region where the phase separation is sufficient. On the other hand, in the present embodiment, the illuminance of the irradiated ultraviolet light is uniform in the entire liquid crystal cell 250. Therefore, the bias in the ultraviolet light in the liquid crystal cell 250 is reduced, and the liquid crystal molecule 220 and the polymer structure 222 are sufficiently phase-separated, thereby manufacturing the display panel 102 having uniform display characteristics. As a result, a highly reliable display device 10 can be manufactured.

[Configuration of Ultraviolet Radiation System]

Hereinafter, an UV irradiation device used in the above-described manufacturing method for the display panel according to the present embodiment will be described. The UV irradiation device is used in a step (process S305 in FIG. 3) of irradiating the liquid crystal cell 250 with ultraviolet light.

Figure 8:
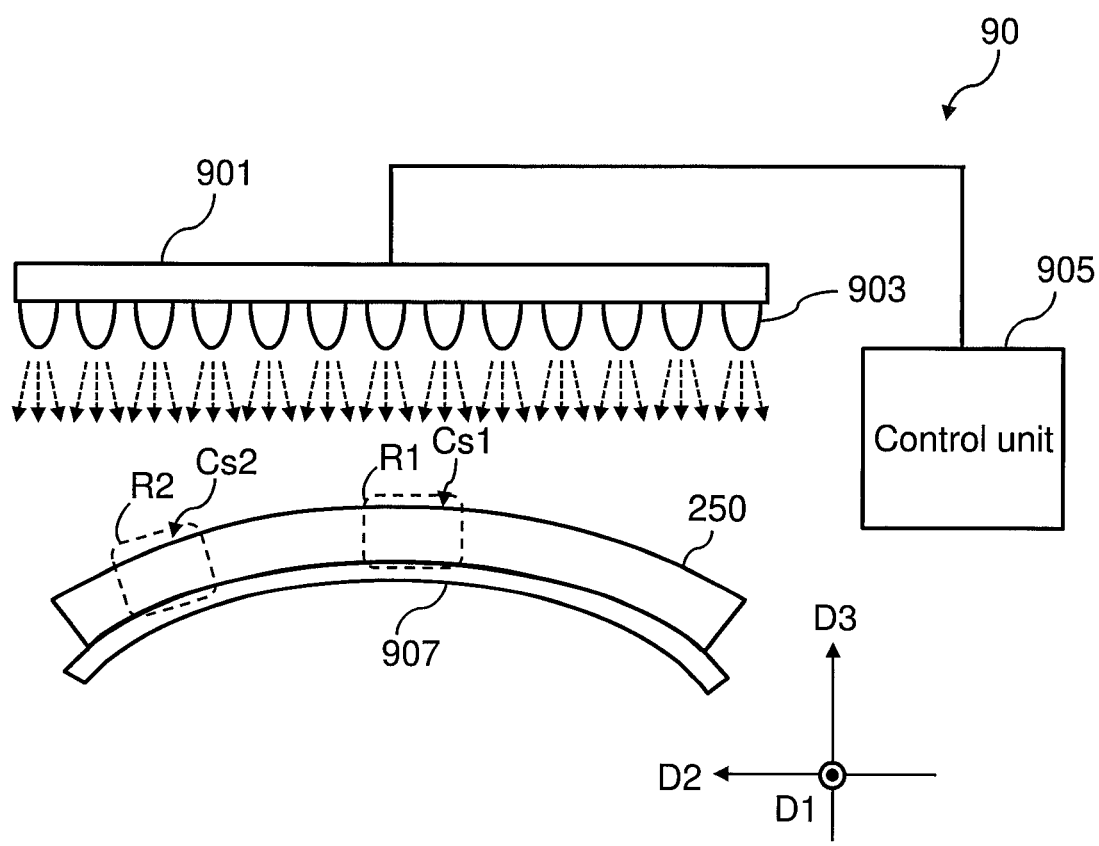
FIG. 8 is a schematic diagram showing a configuration of an UV irradiation device according to an embodiment.

FIG. 8 is a schematic diagram showing a configuration of a UV radiation device 90. As shown in FIG. 8, the UV irradiation device 90 includes a light source unit 901, a control unit 905, and a support unit 907. The UV irradiation device 90 irradiates the liquid crystal cell 250 with ultraviolet light from the light source unit 901. The protective substrate 151B is attached to one surface of the liquid crystal cell 250 facing the light source unit 901, and the protective substrate 151A is attached to the other surface opposite to the one surface by the OCA, but the protective substrate 151A and the protective substrate 151B are not shown in FIG. 8.

The light source unit 901 includes a plurality of light sources 903. Each of the plurality of light sources 903 is a UVLED that emits ultraviolet light. The light source unit 901 is positioned on the third direction D3 side relative to the liquid crystal cell 250, that is, the upper side of the liquid crystal cell 250, and irradiates the liquid crystal cell 250 with ultraviolet light. The light source unit 901 may be a plane light source in which the plurality of light sources 903 is arranged in the row direction and the column direction, respectively.

The control unit 905 adjusts the amount of ultraviolet light emitted from the light source unit 901 toward the surface of the liquid crystal cell 250 based on the shape of the liquid crystal cell 250. The control unit 905 will be described in detail later.

The support unit 907 supports the liquid crystal cell 250 relative to the light source unit 901. Although not shown, the support unit 907 contacts the protective substrate 151A attached to the other surface of the liquid crystal cell 250 opposite a surface of the liquid crystal cell 250 facing the light source unit 901, and has a surface along the curved surface of the protective substrate 151A.

The function of the control unit 905 will be described in detail. As described above, the control unit 905 adjusts the amount of ultraviolet light emitted from the light source unit 901 toward the liquid crystal cell 250.

In the present embodiment, the curved surface of the liquid crystal cell 250 includes the first curved surface Cs1 having the first curvature and the second curved surface Cs2 having the second curvature. The second curvature is greater than the first curvature. The first curved surface Cs1 is arranged in the first region R1 of the liquid crystal cell 250, and the second curved surface Cs2 is arranged in the second region R2 that is different from the first region R1 of the liquid crystal cell 250. The first region R1 is any region of the liquid crystal cell 250. The second region R2 is any region of the liquid crystal cell 250 that is closer to the end portion of the liquid crystal cell 250 in the second direction D2 than the first region R1.

The control unit 905 adjusts the amount of ultraviolet light emitted toward the liquid crystal cell 250 such that the illuminance in the first region R1 is equal to the illuminance in the other region including the second region R2 of the liquid crystal cell 250 excluding the first region R1. In other words, the amount of ultraviolet light emitted toward the liquid crystal cell 250 is adjusted so that the illuminance of the ultraviolet light in the display panel 102 is uniform throughout the liquid crystal cell 250. Specifically, the control unit 905 adjusts the amount of ultraviolet light relative to the liquid crystal cell 250 such that the illuminance in the first region R1 of the liquid crystal cell 250 is equal to the illuminance in the other region including the second region R2 of the liquid crystal cell 250.

For example, the control unit 905 adjusts the amount of ultraviolet light emitted from the light source unit 901 to the liquid crystal cell 250 so that the illuminance in the first region R1 and the illuminance in the second region R2 are equal to each other. Specifically, the control unit 905 adjusts the amount of ultraviolet light emitted from the light source unit 901 to the liquid crystal cell 250 so that the amount of ultraviolet light irradiated to the second curved surface Cs2 in the second region R2 of the liquid crystal cell 250 is greater than the amount of ultraviolet light irradiated to the first curved surface Cs1 in the first region R1. In this case, the irradiation time of the ultraviolet light irradiated toward the first curved surface Cs1 and the irradiation time of the ultraviolet light irradiated toward the second curved surface Cs2 are the same.

The control unit 905 adjusts the amount of the ultraviolet light emitted from the light source unit 901 toward the surface of the liquid crystal cell 250 so that the difference between the illuminance in the first region R1 of the liquid crystal cell 250 and the illuminance in the other region including the second region R2 of the liquid crystal cell 250 excluding the first region R1 is 15% or less. The difference between the illuminance of the ultraviolet light in the first region R1 and the illuminance of the ultraviolet light in the other region including the second R2 of the liquid crystal cell 250 excluding the first region R1 is preferably 10% or less, more preferably 5% or less.

As described above, the control unit 905 adjusts the amount of the ultraviolet light emitted from the light source unit 901 toward the surface of the liquid crystal cell 250, so that the illuminance of the ultraviolet light emitted to the liquid crystal cell 250 having a curved surface can be made uniform.

MODIFICATIONS

Although an embodiment of the present invention has been described above, the present invention can be implemented in various aspects as follows.

(1) First Modification

In the above-described embodiment, the case where the display panel 102 has a curved surface that is generally convex in the third direction D3, the first curved surface Cs1 having the first curvature is arranged in the first region R1 of the display panel 102, and the second curved surface Cs2 having the second curvature is arranged in the second region R2 has been described. However, the present invention is not limited to this. The display panel 102 may have at least a partially curved surface, and the second region R2 of the display panel 102 may be plane.

(2) Second Modification

In the present embodiment described above, as shown in FIG. 5, each of the protective substrate 151A and the protective substrate 151B has the curved surface that is convex in the third direction D3. However, the curved surface of the protective substrate 151A and the protective substrate 151B is not limited to this. For example, the protective substrate 151A and the protective substrate 151B may have a concave surface that is concave toward the direction opposite to the third direction D3.

(3) Third Modification

In the above-described embodiment, the control unit 905 of the UV irradiation device 90 adjusts the amount of the ultraviolet light irradiated from the light source unit 901 toward the liquid crystal cell 250. However, the present invention is not limited to this.

Figure 9:
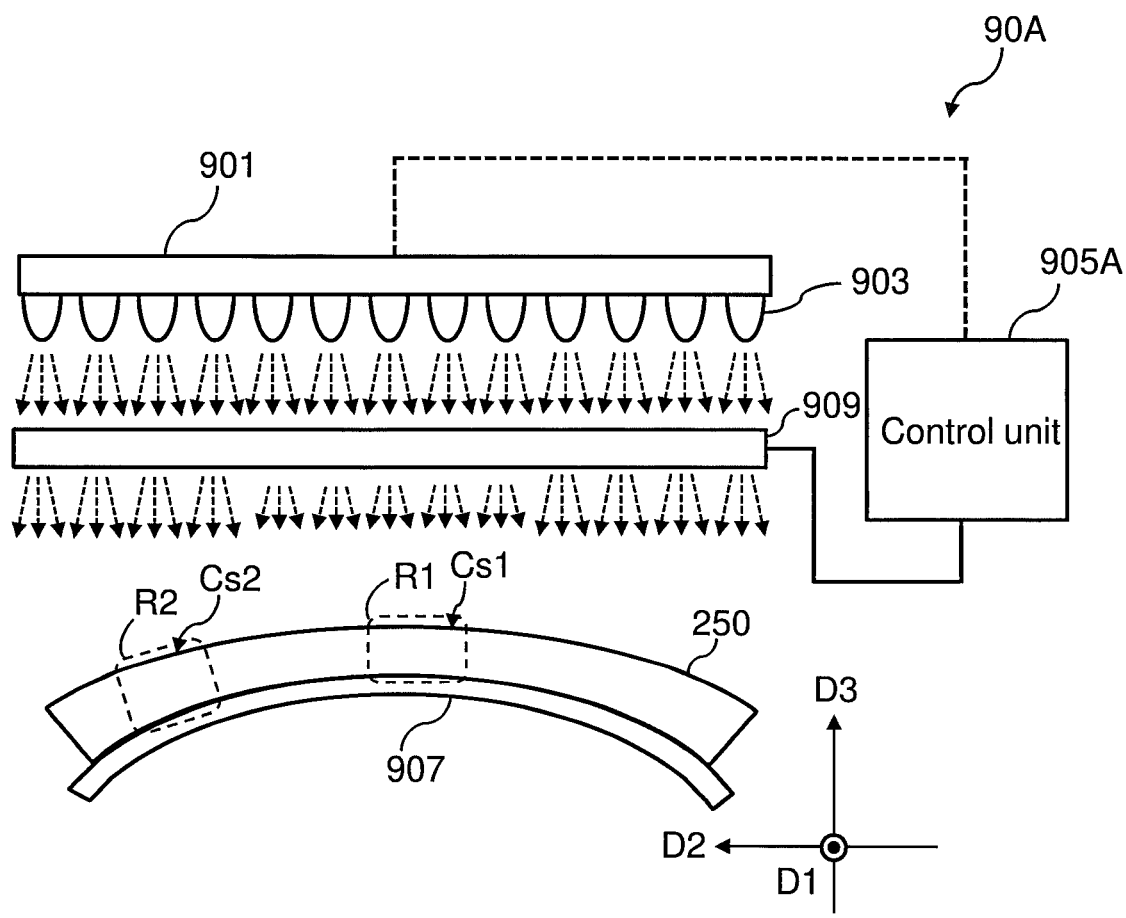
FIG. 9 is a schematic diagram showing a configuration of an UV irradiation device according to a modification.

FIG. 9 is a schematic diagram showing a configuration of a UV irradiation device 90A according to the present modification. The UV irradiation device 90A includes the light source unit 901, a control unit 905A, the support unit 907, and a light-modulating unit 909. Since the light source unit 901 and the support unit 907 are similar to the light source unit 901 and the support unit 907 in the above-described embodiment, detailed explanation thereof will be omitted. In addition, the protective substrate 151B is attached to one surface of the liquid crystal cell 250 facing the light source unit 901, and the protective substrate 151A is attached to the other surface opposite to the one surface by the OCA, but the protective substrate 151A and the protective substrate 151B are not shown in FIG. 9.

The light-modulating unit 909 is arranged between the light source unit 901 and the support unit 907 that supports the liquid crystal cell 250. The light-modulating unit 909 is a light-modulating element that adjusts the amount of ultraviolet light emitted from the light source unit 901 to the liquid crystal cell 250. For example, the light-modulating unit 909 may be any light-modulating element capable of adjusting the amount of transmitted light, such as an electrochromic panel, a liquid crystal panel, a PDLC panel, or a switchable mirror.

The control unit 905A adjusts the amount of ultraviolet light irradiated toward the liquid crystal cell 250 by controlling the light-modulating unit 909 so that the illuminance of ultraviolet light in the first region R1 of the liquid crystal cell 250 is equal to the illuminance of ultraviolet light in the other region, for example, in the second region R2, of the liquid crystal cell 250 excluding the first region R1.

For example, as in the above-described embodiment, in the case where the first curved surface Cs1 having the first curvature is arranged in the first region R1 of the liquid crystal cell 250 and the second curved surface Cs2 having the second curvature (the second curvature>the first curvature) is arranged in the second region R2, the control unit 905A adjusts the amount of light modulation by the light-modulating unit 909 by controlling the light-modulating unit 909 so that the amount of the ultraviolet light irradiated toward the second curved surface Cs2 is greater than the amount of the ultraviolet light irradiated toward the first curved surface Cs1.

As described above, by providing the light-modulating unit 909 and adjusting the amount of light modulation by the light-modulating unit 909 based on the shape of the liquid crystal cell 250 by the control unit 905A makes it possible to adjust the illuminance of the ultraviolet light irradiated on the surface of the liquid crystal cell 250 to be uniform overall.

(4) Fourth Modification

In the third modification described above, the light-modulating unit 909 is provided to adjust the illuminance of the UV irradiated on the surface of the liquid crystal cell 250 so as to be uniform overall. However, the UV irradiation device may include a diffuser plate instead of the light-modulating unit.

Figure 10:
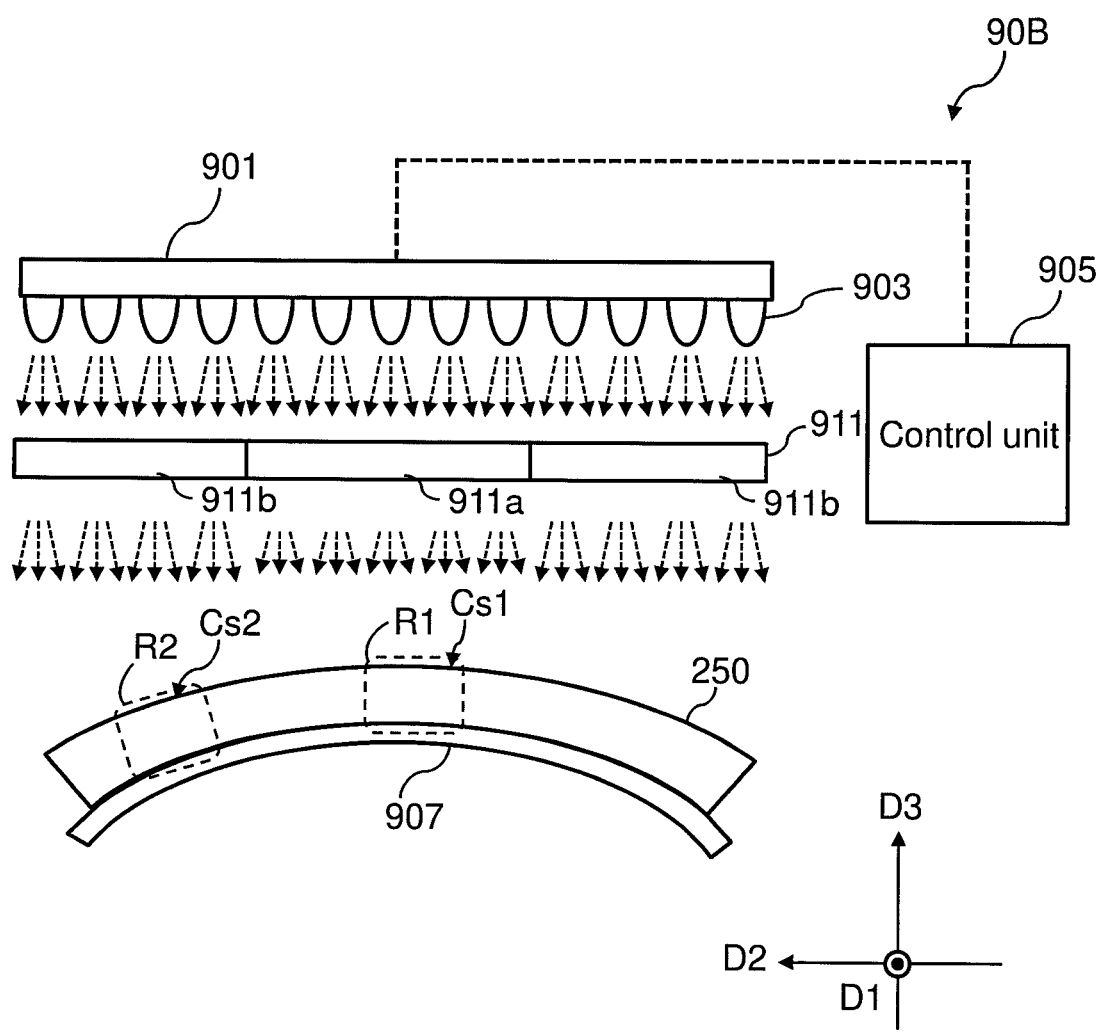
FIG. 10 is a schematic diagram showing a configuration of an UV irradiation device according to a modification.

FIG. 10 is a schematic diagram showing a configuration of a UV irradiation device 90B according to the present modification. The UV irradiation device 90B includes the light source unit 901, the control unit 905, the support unit 907, and a diffuser plate 911. Since the light source unit 901, the control unit 905, and the support unit 907 are similar to the light source unit 901, the control unit 905, and the support unit 907 in the above-described embodiment, detailed explanation thereof will be omitted. In addition, similar to FIG. 9, in FIG. 10, the protective substrate 151A and the protective substrate 151B attached to the liquid crystal cell 250 are not shown.

The diffuser plate 911 is arranged between the light source unit 901 and the support unit 907 that supports the liquid crystal cell 250. The diffuser plate 911 has a diffusion pattern based on the shape of the liquid crystal cell 250 having the curved surface. For example, the diffuser plate 911 includes a first diffusion region 911a having a first diffusion pattern with a first diffusion rate, and a second diffusion region 911b having a second diffusion pattern with a second diffusion rate. In this case, the second diffusion rate is higher than the first diffusion rate (the second diffusion rate>the first diffusion rate).

As shown in FIG. 10, the first curved surface Cs1 having the first curvature is arranged in the first region R1 of the liquid crystal cell 250, and the second curved surface Cs2 having the second curvature (the second curvature>the first curvature) is arranged in the second region R2. In the case where the second region R2 is closer to the end portion of the liquid crystal cell 250 in the second direction D2 than the first region R1, the second diffusion region 911b of the diffuser plate 911 is arranged outside the first diffusion region 911a in the second direction D2. In other words, the first diffusion region 911a and the second diffusion region 911b of the first diffuser plate 911 are arranged corresponding to the first region R1 and the second region R2 of the liquid crystal cell 250 so that the light diffused from the first diffusion region 911a of the first diffuser plate 911 is mainly irradiated onto the first region R1 of the liquid crystal cell 250 and the light diffused from the second diffusion region 911b is mainly irradiated onto the second region R2 of the liquid crystal cell 250.

As described above, since the diffusion rate of the second diffusion region 911b is higher than the diffusion rate of the first diffusion region 911a, the amount of ultraviolet light irradiated toward the second region R2 of the liquid crystal cell 250 via the diffuser plate 911 is greater than the amount of ultraviolet light irradiated toward the first region R1. As described above, by installing the diffuser plate 911 including the first diffusion pattern and the second diffusion pattern having different diffusion rates are arranged, the illuminance of ultraviolet light on the surface of the liquid crystal cell 250 can be adjusted to be uniform overall.

(5) Fifth Modification

In the above-described embodiment, in the case where the control unit 905 adjusts the amount of ultraviolet light irradiated from the light source unit 901 toward the liquid crystal cell 250 based on the shape of the liquid crystal cell 250, the control unit 905 measures the illuminance of the ultraviolet light irradiated to the liquid crystal cell 250, and based on the measurement result, the amount of ultraviolet light irradiated from the light source unit 901 toward the liquid crystal cell 250 can be further finely adjusted.

Figure 11:
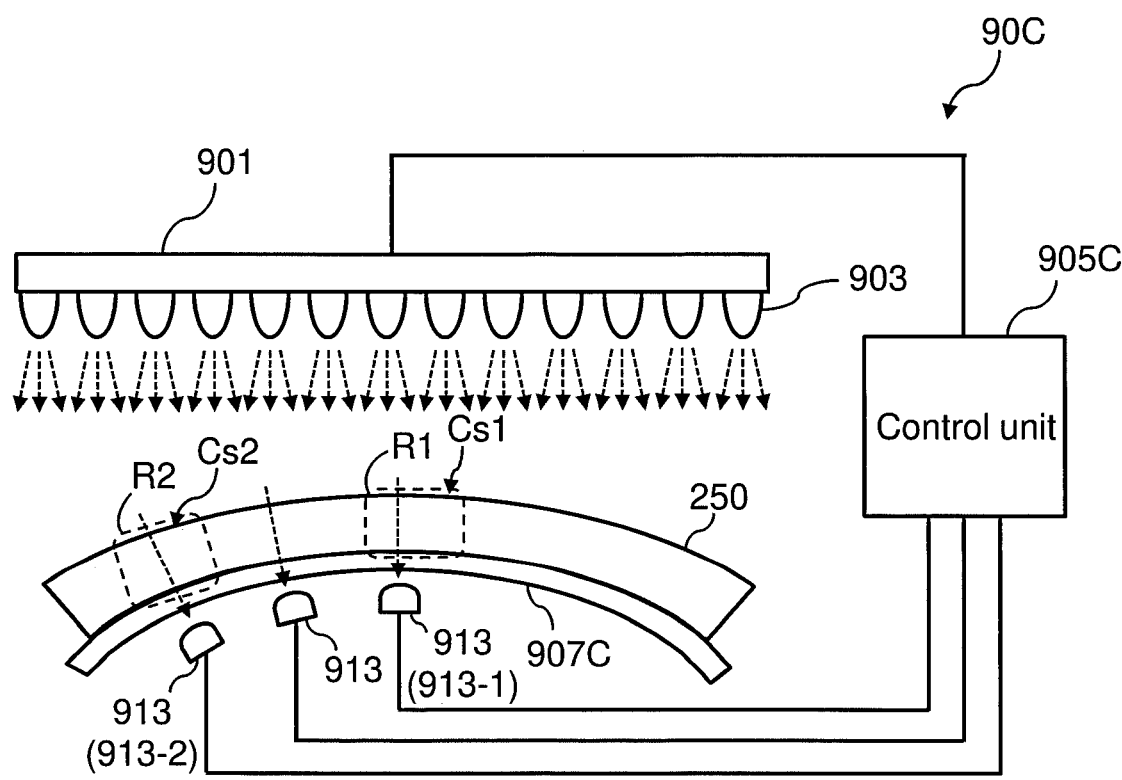
FIG. 11 is a schematic diagram showing a configuration of an UV irradiation device according to a modification.

FIG. 11 is a schematic diagram showing a configuration of a UV irradiation device 90C according to the present modification. The UV irradiation device 90C includes the light source unit 901, a control unit 905C, a support unit 907C, and a plurality of illuminance sensors 913. Since the light source unit 901 is similar to the light source unit 901 in the above-described embodiment, detailed explanation thereof will be omitted. In addition, similar to FIG. 9, in FIG. 11, the protective substrate 151A and the protective substrate 151B attached to the liquid crystal cell 250 are not shown.

In the present modification, the support unit 907C is composed of a transparent member. The plurality of illuminance sensors 913 is arranged on the lower side of the support unit 907C. Each of the plurality of illuminance sensors 913 measures the illuminance of the ultraviolet light irradiated from the light source unit 901 to the liquid crystal cell 250, and transmits the measurement result to the control unit 905C.

The plurality of illuminance sensors 913 measures the illuminance of the ultraviolet light irradiated from the light source unit 901 to the liquid crystal cell 250 in predetermined regions of the liquid crystal cell 250. For example, the plurality of illuminance sensors 913 includes an illuminance sensor 913-1, which measures the amount of ultraviolet light transmitted through the first region R1 having the first curved surface Cs1 having the first curvature of the liquid crystal cell 250, and an illuminance sensor 913-2, which measures the amount of ultraviolet light transmitted through the second region R2 having the second curved surface Cs2 having the second curvature, that is different from the first curvature, of the liquid crystal cell 250. The illuminance sensor 913-1 may be arranged on the lower side of the normal direction of any tangential plane in the first region R1, and the illuminance sensor 913-2 may be arranged on the lower side of the normal direction of any tangential plane in the second region R2.

The control unit 905C adjusts the amount of ultraviolet light emitted from the light source unit 901 in response to the measurement result transmitted from the illuminance sensor 913. For example, the control unit 905C finely adjusts the amount of the ultraviolet light irradiated from the light source unit 901 toward the liquid crystal cell 250 so that the difference between the illuminance of the ultraviolet light in the first region R1 of the liquid crystal cell 250 and the illuminance of the ultraviolet light in the other region including the second region R2 of the liquid crystal cell 250 excluding the first region R1 is 15% or less based on the measurement result by the illuminance sensor 913-1 and the illuminance sensor 913-2. The difference between the illuminance of ultraviolet light in the first region R1 of the liquid crystal cell 250 and the illuminance of ultraviolet light in the other region including the second region R2 of the liquid crystal cell 250 excluding the first region R1 is preferably 10% or less, and more preferably 5% or less.

In the present modification, the illuminance sensors 913 measure the illuminance of the ultraviolet light irradiated from the light source unit 901 to the liquid crystal cell 250, and the control unit 905C further finely adjusts the amount of the ultraviolet light emitted from the light source unit 901 to the liquid crystal cell 250 based on the measurement result. Therefore, in order to make the illuminance of the ultraviolet light in the liquid crystal cell 250 having the curved surface uniform, the amount of the ultraviolet light emitted from the light source unit 901 can be finely adjusted based on the shape of the liquid crystal cell 250.

Furthermore, the control unit 905C may finely adjust the amount of ultraviolet light emitted to the liquid crystal cell 250 based on the illuminance of the ultraviolet light in the liquid crystal cell 250 measured by the illuminance sensors 913, and the measurement result of the voltage-illuminance characteristics of the display panel 102, in particular the measured threshold voltage of the display panel 102. As described above, by further finely adjusting the amount of the ultraviolet light emitted to the liquid crystal cell 250 based on the threshold voltage of the display panel 102, it is preferable to suppress the variation in the threshold voltage in the surface of the display panel 102 to 0.5 V or less, more preferably 0.3 V or less, and even more preferably 0.2 V or less.

(6) Sixth Modification

In the above-described embodiment, the light source unit 901 of the UV irradiation device 90 is the plane light source. However, the light source unit 901 may be a line light source. In the case where the light source unit 901 is a line light source, the liquid crystal cell 250 may be subjected to scanning exposure when the liquid crystal cell 250 is irradiated with ultraviolet light. In this case, the exposure time may be adjusted based on the shape of the liquid crystal cell 250. Specifically, a control unit 95 of the UV irradiation device 90 may adjust the exposure time of ultraviolet light so that the illuminance of the ultraviolet light in the first region R1 of the liquid crystal cell 250 and the illuminance of the ultraviolet light in the second region R2 are equal.

(7) Seventh Modification

In the above-described embodiment, the control unit 905 of the UV irradiation device 90 adjusts the amount of the ultraviolet light irradiated from the light source unit 901 toward the liquid crystal cell 250. However, the control unit 905 may adjust not only the amount of ultraviolet light irradiated from the light source unit 901 toward the liquid crystal cell 250 but also the irradiation time. Specifically, the control unit 905 adjusts the amount of ultraviolet light and the irradiation time so that the integrated illuminance of ultraviolet light in the first region R1 of the liquid crystal cell 250 and the integrated illuminance of ultraviolet light in the other region including the second region R2 of the liquid crystal cell 250 are equal to each other, and irradiates the liquid crystal cell 250 with ultraviolet light. In this case, the integrated illuminance is an accumulative illuminance value ($[mJ/cm^2]$) irradiated to a unit area during the ultraviolet irradiation time, that is obtained by integrating the time ([sec]) with the illuminance per unit area ($[mW/cm^2]$).

(8) Eights Modification

In the above-described embodiment, in the manufacturing method for the display panel, the display panel 102 is manufactured by preparing the protective substrate 151A and the protective substrate 151B having the curved surface in advance, attaching the protective substrate 151A and the protective substrate 151B to the liquid crystal cell 250, and irradiating the liquid crystal cell 250 with ultraviolet light. However, the manufacturing method for the display panel 102 is not limited to this.

For example, a curved surface may be formed on the liquid crystal cell 250 by fixing two mutually-parallel sides of the liquid crystal cell 250 with a jig. In this case, the liquid crystal cell 250 is irradiated with ultraviolet light while the liquid crystal cell 250 is fixed with the jig and the curved surface is maintained, thereby forming the liquid crystal layer 210. At this time, similar to the above-described embodiment, the amount of ultraviolet light is adjusted so that the illuminance of the ultraviolet light irradiated to the liquid crystal cell 250 to be uniform on the entire surface of the liquid crystal cell 250. Thereafter, the protective substrate 151A and the protective substrate 151B having the curved surface in advance may be bonded to the liquid crystal cell 250 to form the display panel 102.

Furthermore, in the above-described embodiment, although the protective substrate 151A and the protective substrate 151B having the curved surface in advance are attached to the liquid crystal cell 250, the curved surface may not be formed in advance in one of the protective substrate 151A and the protective substrate 151B. For example, in the case where the curved surface is not formed on the protective substrate 151A in advance, a curved surface may be formed on the liquid crystal cell 250 by attaching the protective substrate 151B having a curved surface in advance to the liquid crystal cell 250, and then a curved surface may be formed on the protective substrate 151A by attaching the protective substrate 151A to the liquid crystal cell 250. In addition, a curved surface may be formed on the liquid crystal cell 250 and the protective substrate 151A by attaching the protective substrate 151A in which no curved surface is formed in advance to the liquid crystal cell 250, and then attaching the protective substrate 151B having a curved surface to the liquid crystal cell 250 in advance.

(9) Ninth Modification

In the embodiment described above, as shown in FIG. 1, the light source 104 is arranged adjacent to the display panel 102. However, in the display device 10, the position of the light source 104 is not limited to next to the display panel 102.

Figure 12:
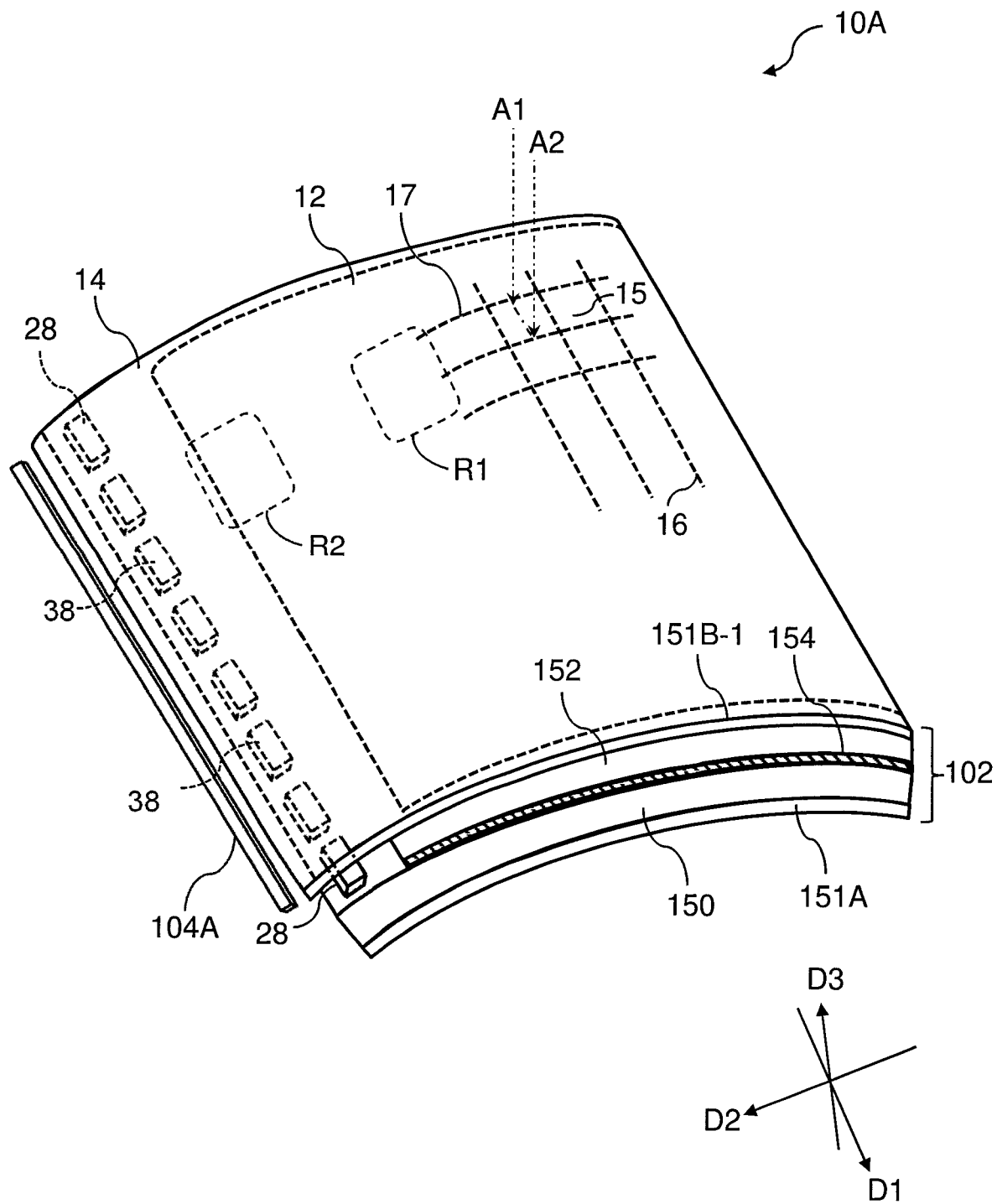
FIG. 12 is a perspective view of a display device according to a modification.

FIG. 12 is a perspective view of a display device 10A according to the present modification. In the display device 10A, the size of a protective substrate 151B-1 adjacent to the second substrate 152 is different from that of the protective substrate 151B of the display device 10 shown in FIG. 1. As shown in FIG. 12, the protective substrate 151B-1 extends in the second direction D2 to cover the gate driving circuit 28 and the data driving circuit 38 arranged on the first substrate 150. The protective substrate 151B-1 may extend to the second direction D2 side longer than the first substrate 150 and the protective substrate 151A adjacent to the first substrate 150.

As shown in FIG. 12, a light source 104A may be arranged adjacent to the protective substrate 151B-1. In particular, the light source 104A may be arranged adjacent to the end portion of the protective substrate 151B-1 in the second direction D2.

What is claimed is:
1. A UV irradiation device comprising:
a light source unit including a plurality of light sources irradiating ultraviolet light; and a control unit adjusting an amount of ultraviolet light irradiated from the light source unit toward a surface of a liquid crystal cell having at least a partially curved surface, wherein the control unit adjusts the amount of ultraviolet light irradiated from the light source unit toward the surface of the liquid crystal cell so that an illuminance of the ultraviolet light in any first region on the curved surface of the liquid crystal cell is equal to the illuminance of the ultraviolet light in any second region on the surface of the liquid crystal cell including the curved surface that is different from the first region, and wherein the curved surface includes a first curved surface in the first region having a first curvature and a second curved surface in the second region having a second curvature greater than the first curvature.

2. The UV irradiation device according to claim 1, wherein the control unit controls an amount of ultraviolet light irradiated from a plurality of light sources in the light source unit so that the amount of ultraviolet light irradiated on the second curved surface is greater than the amount of ultraviolet light irradiated on the first curved surface.

3. The UV irradiation device according to claim 2, wherein the second region is positioned outside the first region in a predetermined direction.

4. The UV irradiation device according to claim 1, further comprising a light modulating unit arranged between the light source unit and the liquid crystal cell to adjust the amount of ultraviolet light irradiated from the light source unit toward the liquid crystal cell, wherein the control unit controls the light modulating unit so that the amount of ultraviolet light irradiated toward the second curved surface is greater than the amount of ultraviolet light irradiated toward the first curved surface.

5. The UV irradiation device according to claim 4, wherein the second region is positioned outside the first region in a predetermined direction.

6. The UV irradiation device according to claim 1, further comprising a plurality of sensors measuring the illuminance of the ultraviolet light irradiated from the light source unit on the surface of the liquid crystal cell, wherein the control unit adjusts the amount of the ultraviolet light irradiated from the light source unit toward the surface of the liquid crystal cell based on the measurement results by the plurality of sensors.

* * * * *